(12) United States Patent
Martin, Jr. et al.

(10) Patent No.: US 6,978,059 B2
(45) Date of Patent: Dec. 20, 2005

(54) MULTI-CHANNEL PASSIVE DENSE WAVELENGTH DIVISION MULTIPLEXING MODULE

(75) Inventors: Jack C. Martin, Jr., Cumming, GA (US); Edward M. Pucko, Jr., Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/920,628

(22) Filed: Aug. 18, 2004

(65) Prior Publication Data

US 2005/0018953 A1   Jan. 27, 2005

Related U.S. Application Data

(63) Continuation of application No. 09/875,418, filed on Jun. 6, 2001.

(51) Int. Cl.[7] .............................. G02B 6/00; G02B 6/42
(52) U.S. Cl. ............................ 385/16; 398/79; 398/82; 398/83; 398/85
(58) Field of Search .......................... 385/14, 134, 24, 385/31, 42; 398/79, 82–83, 85

(56) References Cited

U.S. PATENT DOCUMENTS 6,396,611 B1   5/2002   Distefano et al.
6,504,963 B1 *  1/2003   Fang et al. .................... 385/16

2002/0141720 A1 * 10/2002   Halgren et al. .............. 385/134

OTHER PUBLICATIONS

Lucent Technologies Press Release and Product Brochure/Tech Sheets, "Lucent Technologies delivers next-generation portfolio of products that breaks the metro bottleneck", Jun. 5, 2001.
Evolution of Optical Transport Technologies: From SONET/SDH to WDM; Dirceu Cavendish, C&C Research Laboratories; IEEE Communications Magazine Jun. 2000; pp. 164-172.
Lucent Technologies; Metropolis article; Jun. 5, 2001; 9 pages.

* cited by examiner

*Primary Examiner*—John D. Lee
*Assistant Examiner*—Eric Wong
(74) *Attorney, Agent, or Firm*—Cantor Colburn LLP (57) ABSTRACT

A multi-channel passive DWDM multiplexing module, which can be installed in a standard shelf of a patch panel, takes multiple optical signals of defined frequencies and provides a multiplexed optical output. The module simplifies greatly intraoffice fiber optical connections by situating itself adjacent where the fiber optical cables are terminated, thus eliminating fiber optical cable routing through overhead racks. The module saves inter-office fiber optical resources by providing passive DWDM multiplexing, which combines multiple optical signals into one fiber optical cable. The module further saves cost on spare parts at each central office by providing a maintenance connection that can be alternately used as a spare input connection.

10 Claims, 8 Drawing Sheets

MULTI-CHANNEL PASSIVE DENSE WAVELENGTH DIVISION MULTIPLEXING MODULE

CROSS-REFERENCE TO RELATED APPLICATIONS

This application is a continuation of U.S. patent application Ser. No. 09/875,418 filed Jun. 6, 2001, the contents of which are incorporated by reference herein in their entirety.

FIELD OF THE INVENTION

The present invention relates to the field of hardware assembly for a telecommunications frame, and more specifically to a module assembly for an optical cross-connect frame.

BACKGROUND OF THE INVENTION

It is clear that as the $21^{st}$ century arrives the remarkable revolution in information services has permeated our society. In the past, communications confined to narrowband voice signals demanded a high quality visual, audio, and data context. Every aspect of human interplay of business, entertainment, government, or academia, depends on rapid and reliable communication networks. Indeed, the advent of the Internet alone is introducing millions of individuals to a new world of information and technology. The telecommunications industry, however, is struggling to keep pace with these changes.

Digital transmission equipment currently being deployed uses optical fibers to carry a single digital signal per fiber per propagation direction. The most successful and widespread type of digital optical protocol is synchronous optical network/synchronous digital hierarchy (SONET/SDH). Most high-speed digital backbones are primarily SONET/SDH-based.

SONET is an optical interface standard that allows interworking of transmission products from multiple vendors. SONET provides framing as well as a rate hierarchy and optical parameters for interfaces ranging from 51 Mb/s (OC-1) up to 9.8 Gb/s (OC-192). It defines a physical interface, optical line rates known as Optical Carrier (OC) signals, frame format, and an OAM&P (Operations, Administration, Maintenance, and Provisioning). SONET has been adopted by the ITU-T (International Telecommunication Union-Telecommunications Standardization Sector). The ITU-T version is known as SDH (Synchronous Digital Hierarchy). SONET/SDH networks typically are deployed in a ring physical topology, with multiple fibers providing redundancy. In addition, SONET may be deployed in a linear physical topology.

SONET was designed to provide a standard access to the optical transmission medium. It uses a specific frame format to carry data plus overhead bytes. SONET channels are synchronous. The synchronization of channels is supported by pointers, which dictate the initial byte position of each channel within the SONET frame. These pointers are used to multiplex digital signals within a single SONET frame efficiently.

The widespread use of fiber is possible, in part, by the industry's acceptance of SONET and SDH as the standard for signal transmission. Using SONET/SDH standards, telecommunication companies have gradually expanded their capacity by increasing data rates, to the point that many carriers now routinely transport 2.4 Gb/s (STM-16/OC-48).

However, once seemingly inexhaustible capacity promised by ever increasing SONET rates is reaching its limit. In fact, bandwidth demand is already approaching the maximum capacity available in some networks. Primarily because of technical limitations and physical properties of embedded fiber, there is a practical ceiling of 2.4 Gb/s on most fiber networks, although there are instances where STM-64/OC-192 is deployed. Surprisingly, the TDM (Time Division Multiplexing) equipment installed today utilizes less than 1% of the intrinsic capacity of the fiber!

The introduction of the wavelength-division multiplexing (WDM) provides more transmission capacity. WDM promises to multiply the bandwidth capacity of the optical transmission medium many folds. The principle behind this increase of the bandwidth capacity is the transmission of multiple digital signals using several wavelengths so there is no interference among the signals. Thus, DWM, effectively provides much greater bandwidth capacity of optical fibers.

WDM enables transmission of various optical signals by a single fiber. The principle behind WDM is essentially the same as the principle behind frequency-division multiplexing (FDM). That is, different carriers occupying non-overlapping parts of a frequency spectrum transmit different signals. In the case of WDM, the spectrum bands used are in the regions of 1310 and 1550 nm, which are the two wavelength windows where single mode optical fibers have very low signal loss.

Initially, a single optical signal transmits through each window. With the advance of optical components, such as distributed feedback (DFB) lasers, erbium-doped fiber amplifiers (EDFAs), and photodetectors, it was soon realized that several optical signals could be transmitting through each window, each optical signal occupying a small fraction of the total wavelength window available. In fact, the number of optical signals multiplexed within a window is limited only by the precision of these components. With current technology, over 100 optical channels can be multiplexed into a single fiber. The technology was then named dense wavelength-division multiplexing (DWDM).

Figure 1:
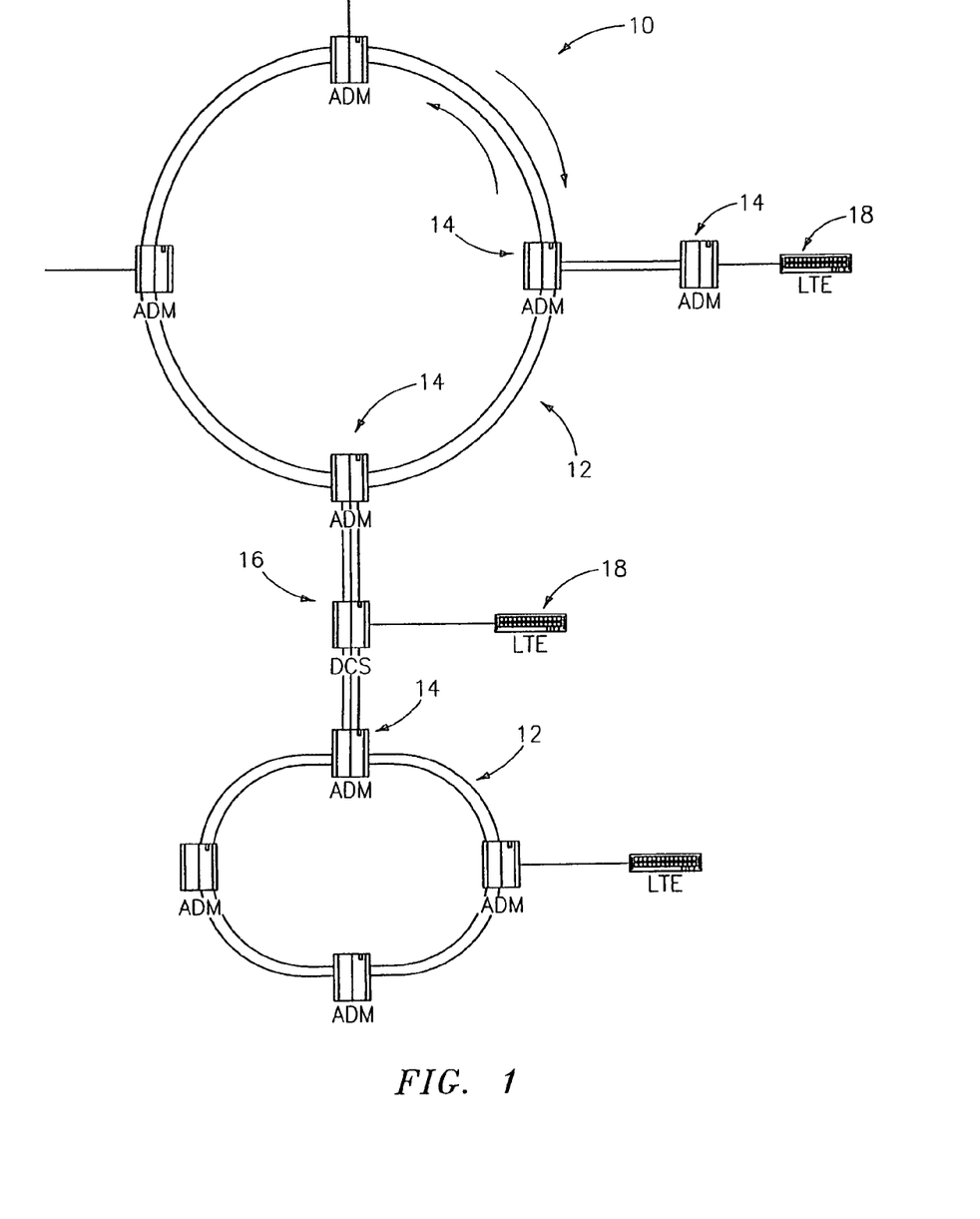
FIG. 1 an illustration of a SONET architecture.

The introduction of WDM or DWDM brings a variety of optical equipment into a central office. FIG. 1 depicts a SONET (Synchronous Optical NETwork) architecture 10, where optical fibers form a ring 12 connecting multiple Add/Drop Multiplexers (ADMs) 14. ADM 14 is also known sometime as Optical Add/Drop Multiplexers (OADMs). A ring 12, which can be a backbone ring, can be connected to another ring 12, which can be an access ring, through a connection from an ADM 14 to a digital cross-connect switch (DCS) 16. An ADM 14 can also be connected to another ADM 14. The connections between ADMs and between an ADM and a DCS can be done through fiber optical cables. Fiber optical cables are connected to a SONET through line terminating equipments (LTE) 18, which can be connected to an ADM 14 or a DCS 16.

FIG. 1 depicts a SONET ring 12 with multiple fibers. The SONET ring 12 also comprises multiple ADMs (add/drop multiplexers) 14. ADMs 14 are SONET devices, which perform low-rate signal grooming into the high-speed SONET signals used in the ring 12. ADMs 14 can also drop SONET signals from a SONET bit stream.

Digital Cross-Connect switches (DCS) 16 are devices used to connect SONET rings 12 together. DCS 16 cross-connects signals across rings 12, providing multiplexing/demultiplexing and switching functions. DCS 16 performs functions similar to that of a normal voice switch, except that connections are typically set-up in advance of when the circuits are to be switched—not coincident with a call.

Line terminating equipment (LTE) 18 is usually reserved for end-user or local area network (LAN) equipment. LTE 18 includes network elements, which originate and/or terminate line (OC-N) signals.

Add/drop multiplexer (ADM) 14, which is connected to a SONET ring 12, adds or drops optical signals from the SONET ring 12. Incoming audio, video, and data signals are converted into optical signals and sent to their destinations through the SONET ring 12. Generally, the optical signals that are added to a SONET ring 12 for transport to their destinations or dropped from the SONET ring 12 for local processing and forwarding to the end user are handled in a central office (CO).

Figure 3:
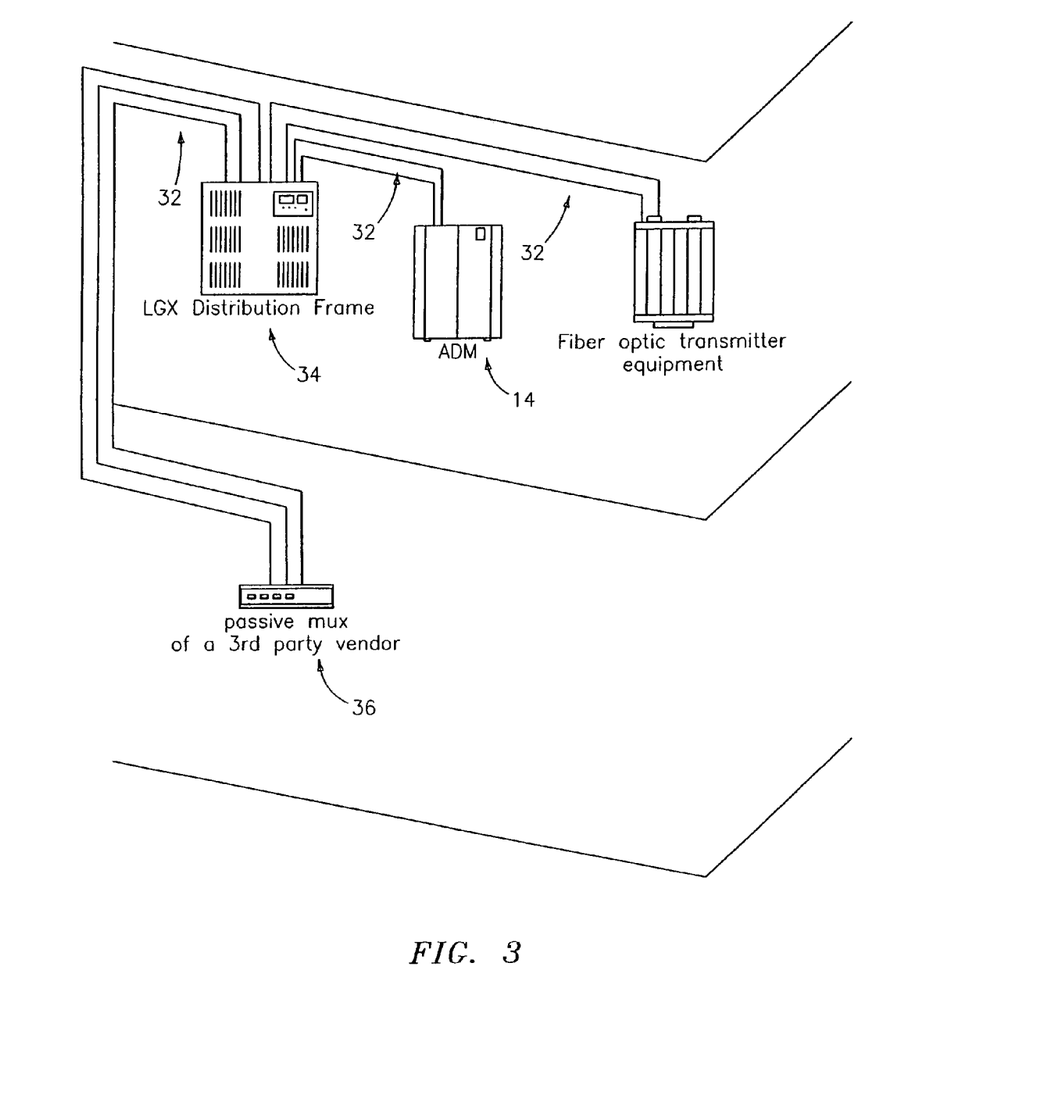
FIG. 3 is a prior art illustration of a distribution of equipment in a central office.

In FIG. 3, the optical signals dropped from an ADM 14 are terminated on the back panel of a six-pack connector located on a light guide cross-connect (LGX) patch panel, also known as LGX distribution frame 34. An optical connector 32 plugged into the front panel of the six-pack connector takes the optical signal to its destination equipment, which can be an optical receiver located on a different floor from the CO or a WDM multiplexer 36 located in a frame several aisles away or on a different floor.

Still referring to FIG. 3, often several optical signals are taken from a LGX patch panel 34 and merged into a single optical signal at a passive WDM multiplexer 36, such as a 16 channel WDM multiplexer from Lucent Technologies, located several floors away from the LGX patch panel 34, from where the merged optical signal is connected to an outgoing fiber optical cable 32. The outgoing fiber optical cable 32 carrying the merged optical signals is then routed back to the LGX patch panel 34 and connected to the back panel of a six-channel connector.

The connection between the LGX patch panel 34 and the passive WDM multiplexer 36 can be several hundred feet away, and the connection cables 32 are generally routed through overhead racks. When a new fiber optical signal is to be added to the outgoing fiber optical cable 32, a new work order needs to be issued for routing new connection optical cables between the LGX patch panel 34 and the passive WDM multiplexer 36.

The resulting installation procedure is costly and time consuming, and the lengthy connecting fiber optical cables carrying these optical signals can degrade the quality of these optical signals.

Another problem created by the introduction of WDM or DWDM in optical networks is an increase in the cost of spare parts. Optical signals are generated by optical transmitters, which take electrical digital signals and convert them into optical signals of a specific frequency. Each optical transmitter is generally designed for a specific optical frequency. In a CO that generates 16 different narrow band optical signals, the CO needs to carry spare parts for each one of the 16 transmitters.

SUMMARY OF THE INVENTION

Briefly described, the present invention provides in one embodiment a module for passive multi-channel WDWM multiplexing, where optical signals are passively multiplexed in a module that is mountable in a shelf of switching equipment.

The module provides passive multi-channel WDWM multiplexing and requires no external power. The module can multiplex multiple optical lasers, one laser on each channel. The lasers are selected from the lasers defined by any OC standards, such as optical carrier 48 (OC-48) or OC-12.

The module is usually mounted on a shelf of the switching equipment in a central office, where switching equipment is placed in several rows separated by aisles. The module generally comprises a housing, multiplexing circuitry placed inside of the housing, a faceplate with a plurality of connector openings attached to the housing, and connectors placed within each opening and connected to the multiplexing circuit.

Connectors are placed in the connector openings. Each connector has two ends: one end sitting in one opening on the faceplate and another end connects to a port in the multiplexing circuit.

The multi-channel passive DWDM multiplexer module can be installed in a central office and preferably on a distribution frame. The module with its connectors located in its faceplate allows easy connection between one of its input connectors and one fiber optical cable terminated on the back panel of a six-channel connector on a distribution frame. The module further makes an easy connection between its output connector and an outgoing multiplexed fiber optical cable terminated on the back panel of the same or different six-channel connector.

The multi-channel passive DWDM multiplexer module, according to the present invention, can be installed preferably in a LGX patch panel of a central office. The input connectors of the module are located in the front side of the patch panel, the same side as the output connector for six-pack connectors. The front side of a patch panel is the side facing an aisle. This arrangement permits a short optical connector cable to be used to connect an output connector of a six-pack connector to an input connector of a multi-channel passive DWDM multiplexer module. This short connection eliminates the work of routing a lengthy optical cable from the output connector of a six-pack connector, through an overhead rack, to an input connector of a multiplexer usually resided on a separate equipment bay located on another floor or several aisles away. Use of this multi-channel passive DWDM multiplexer module significantly saves the cost of fiber optical cable installation.

An optical fiber cable connected to the output connector of the multi-channel passive DWDM multiplexer module routes the multiplexed optical signals to an outgoing fiber optical cable. The connection for the outgoing fiber optical cable is generally located in the front side of a six-pack connector on a distribution frame and the outgoing fiber cable is generally terminated in the back side of this six-pack connector. The connection between the multi-channel passive DWDM multiplexer module and the connector for the outgoing fiber optical cable is through another short optical connector cable.

The present invention also advantageously helps to lower the cost associated with providing spares laser transmitters in a central office. Generally, for equipment that handles 16 different electrical signals, 16 laser transmitters are needed to generate 16 lasers of 16 different frequencies. The failure of one of the laser transmitters causes that laser signal to be dropped if there is no spare transmitter of that particular frequency. With the present invention, the failed transmitter can be replaced by one generic transmitter with a frequency of the maintenance port of the multi-channel DWDM multiplexing module of the present invention. The laser signal will then be connected to the maintenance port of the multi-channel DWDM multiplexing module.

In an alternate embodiment, the multi-channel module is used as de-multiplexing equipment. It receives one incoming multiplexed optical signal and filters the signal into multiple optical signals of different frequencies. This embodiment has similar physical characteristics to the multi-channel multiplexing module, but a reverse optical function.

BRIEF DESCRIPTION OF THE DRAWINGS

The foregoing and other aspects and advantages of the invention described herein will be better understood from the following detailed description of one or more preferred embodiments of the invention with reference to the drawings in which.

DETAIL DESCRIPTION OF THE INVENTION

Referring now in greater details to the drawings, in which like numerals represent like components throughout several views, FIG. 1 was described in the background section and will not be repeated here.

Figure 2:
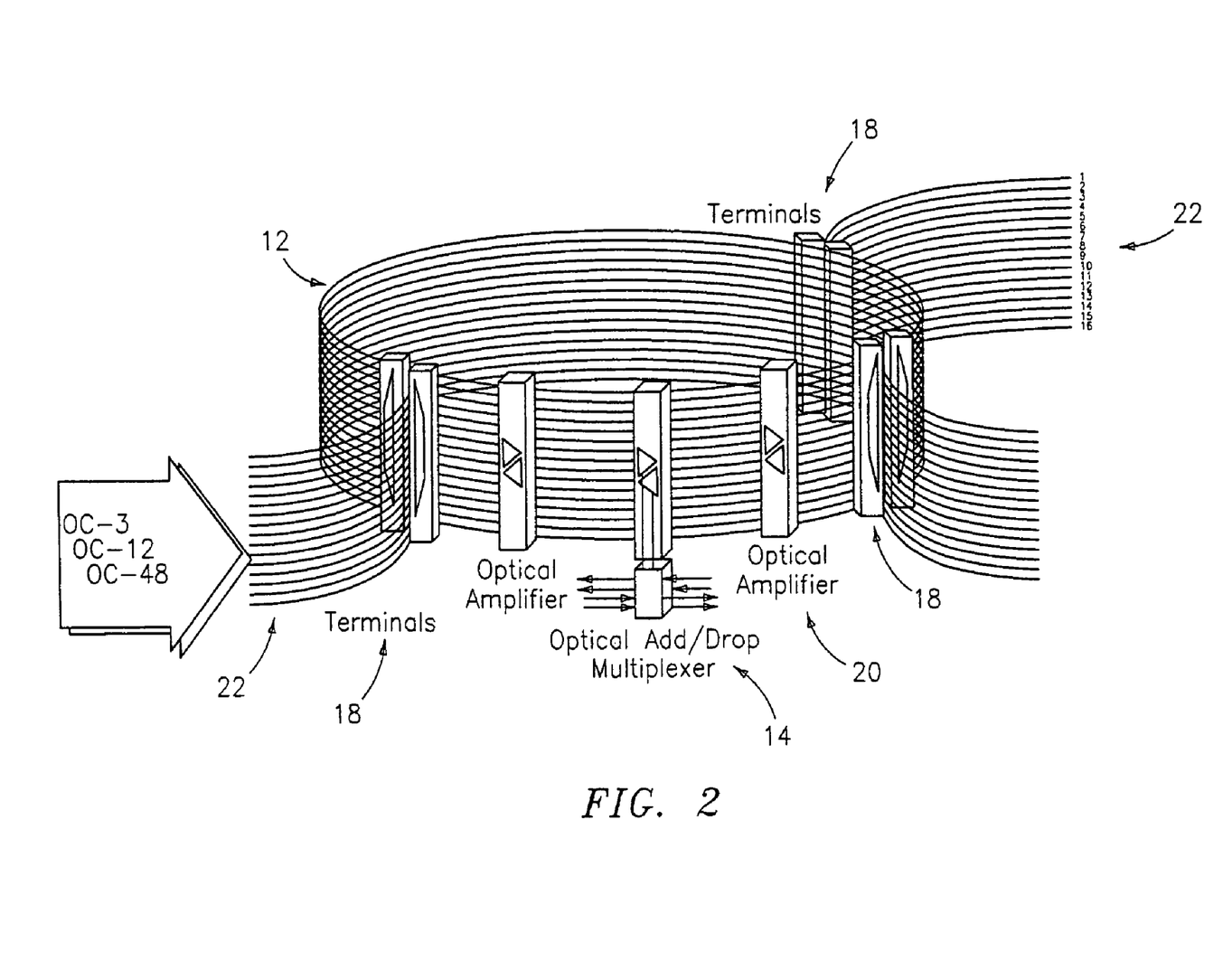
FIG. 2 an illustration of another SONET ring.

FIG. 2 is an illustration of a SONET access ring 12. The ring 12 comprises multiple fiber optical cables. The ring 12 can have various speeds, such as OC-3, OC-12, and OC-48, and can be either uni-directional path-switched rings (UP-SRs) or bi-directional line-switched rings (BLSRs). A UPSR employs redundant fiber optical transmission facilities in a pair configurations, with one fiber transmitting in one direction and with the backup fiber transmitting in the opposite direction. If the primary ring fails, the backup takes over. In a BLSR setting, half of the working network is sent counterclockwise over one fiber and the other half is sent clockwise over another fiber. Optical amplifiers 20 are placed along the ring 12, if the ring 12 exceeds certain length. The optical amplifiers 20 amplify optical signals without converting the signal from optical to electrical and back again to optical energy. The optical amplifiers 20 can be located adjacent to ADMs 14. Incoming fiber optical cables from end-users or LANs are terminated at LTEs 18.

FIG. 3 illustrates a prior art of an exemplary of current fiber optical cable routing in a central office. Optical signals can be "dropped" from a SONET ring 12 (not shown in FIG. 3) at ADMs 14. The optical signals filtered from the ADMs 14 are routed through the connector optical cables 32 terminated in a distribution frame 34 also known as patch panel. The optical cables 32 are terminated on the back of a six-pack connector (not shown in FIG. 3). The patch panel 34 is used to interconnect fiber optical cables in a central office. The patch panel 34 can be located anywhere in a central office. It can be physically adjacent to an ADM14 or removed on another floor.

If there are several optical signals that are destined for another central office or a particular end-user, they can be multiplexed by a multiplexer 36 and carried by a single fiber cable to its destination. This multiplexing provides savings of the fiber optical cable resources.

There are other passive DWDM multiplexers 36, such as provided by Lucent Technologies (WAVESTAR POL-STM™) or Fujitsu (FLASHWAVE METRO), and they do not fit into a patch panel 34. These multiplexers 36 generally are mounted in an equipment bay somewhere inside the central office.

In FIG. 3, the passive DWDM multiplexer 36 is located on another floor, away from the patch panel 34. The optical signals destined for another location are routed from the patch panel 34 through fiber optical cables 32 to the passive DWDM multiplexer 36. The optical signals are multiplexed in the multiplexer 36, and then routed back through fiber optical cables 32 to the patch panel 34 for further distribution.

This laborious and unnecessary routing is eliminated with the present invention.

Figure 4:
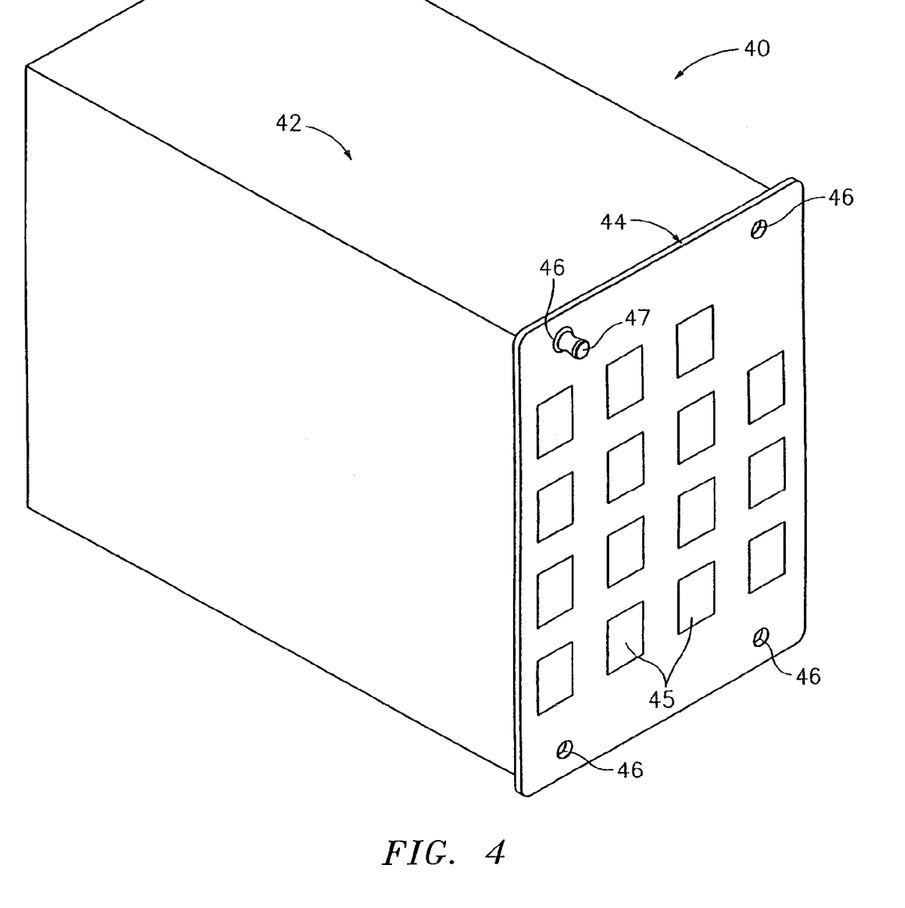
FIG. 4 is a schematic illustration for a de-multiplexer.

FIG. 4 illustrates a perspective view of a passive DWDM multiplexing module 40 according to one embodiment of the present invention. The module 40 has a housing 42, a passive multiplexing circuit (not shown in FIG. 4) inside the housing 42, a faceplate 44 with a plurality of connector openings 45, and a plurality of connectors (not shown in FIG. 4) placed inside the openings and connected to the multiplexing circuit (not shown).

The housing 42 can be made from metal, plastic, or other materials. The multiplexing circuit is a passive circuit and requires no external power. The faceplate can be made from the same or different material from the housing 42.

The housing 42 has a defined dimension that permits the module to be placed into a standard shelf of a LGX patch panel in a central office. The housing 42 is made from metallic material or plastic among other suitable materials. The housing 42 is placed into the shelf with the faceplate facing the aisle.

The multiplexing circuit enables passive DWDM multiplexing of multiple optical signals. The multiplexing circuitry provides multiple input ports and one output port. In a preferred embodiment, the multiplexing circuitry provides thirteen input ports, wherein one of the input ports is reserved for maintenance purposes. In normal operation, twelve incoming optical signals (lasers) are fed to the multiplexing circuitry from which one output is resulted and routed to a destination. The extra input port provided by the multiplexing circuit is normally reserved for maintenance purposes.

The faceplate 44 with multiple connector openings 45 is attached to the housing 42. A plurality of the connector openings 45 are for receiving incoming fiber optical cables, one connector opening 45 is for a maintenance cable, another connector opening 45 is for monitoring cable, and one connector opening 45 is reserved for the output optical cable. In a preferred embodiment, the faceplate 44 has fifteen connector openings 45 for receiving fiber optical cables and four openings 46 for placing attachment mechanisms that attach the module to the shelf.

Figure 5:
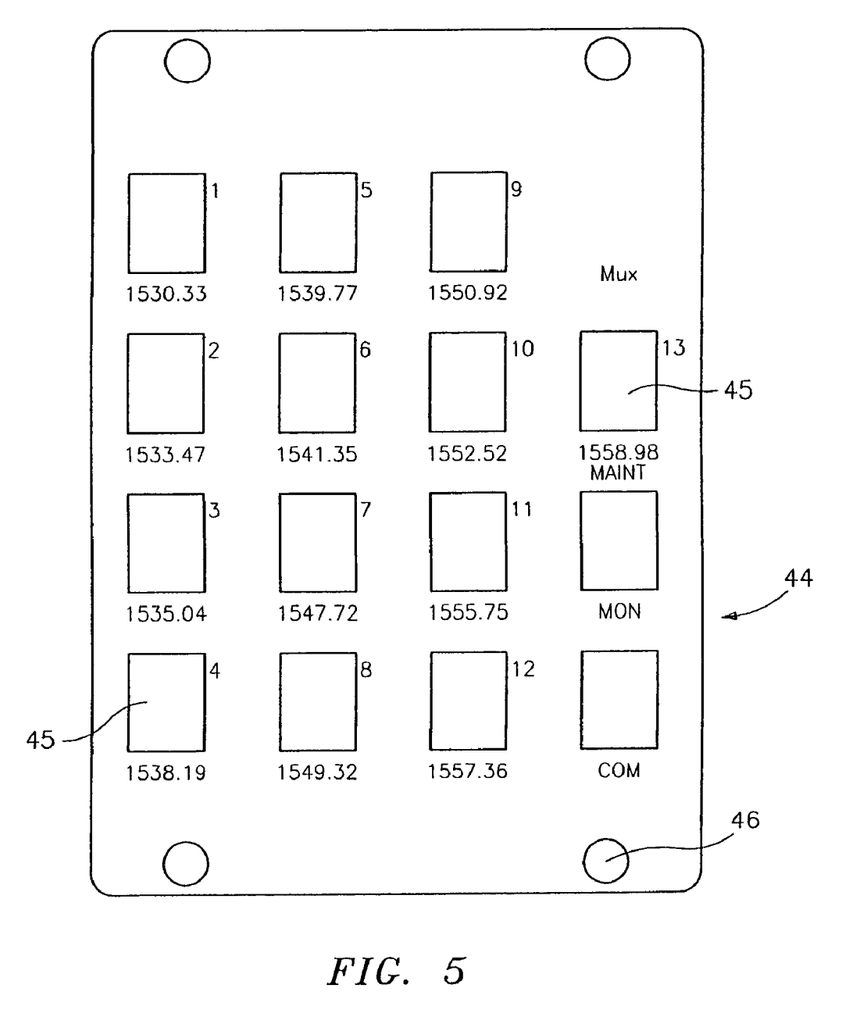
FIG. 5 depicts a faceplate.

FIG. 5 is an illustration of a faceplate 44 according to one embodiment. The faceplate 44 has several connector openings 46, where attachment mechanisms 47 can be inserted to secure the module 40 onto a shelf of a patch panel 34. The attachment mechanisms 47 can be screws, rivets, plastic fasteners, or any other applicable fasteners.

In the embodiment shown in FIG. 5, there are fifteen connector openings 45. Twelve of them, numbered one to twelve are for incoming optical connectors. Each incoming connector has a specific wavelength. In the preferred embodiment shown in FIG. 5, each connector opening is labeled with a wavelength in the 1550 nm window. More particularly, the selected lasers are defined by OC-48 and have the following wavelengths: 1530.33 nanometer, 1533.47 nanometer, 1535.04 nanometer, 1538.19 nanometer, 1539.77 nanometer, 1541.35 nanometer, 1547.72 nanometer, 1549.32 nanometer, 1550.92 nanometer, 1552.52 nanometer, 1555.75 nanometer, 1557.36 nanometer, and 1558.98 nanometer. A connector opening 45 labeled MAINT and numbered 13 is reserved generally for maintenance purposes. However, it can be used as an input like those numbered one to twelve. Two remaining connector openings 45 are labeled as MON and COM. The MON connector opening is for a monitoring connector, and the COM connector opening is for a common output connector.

Figure 6:
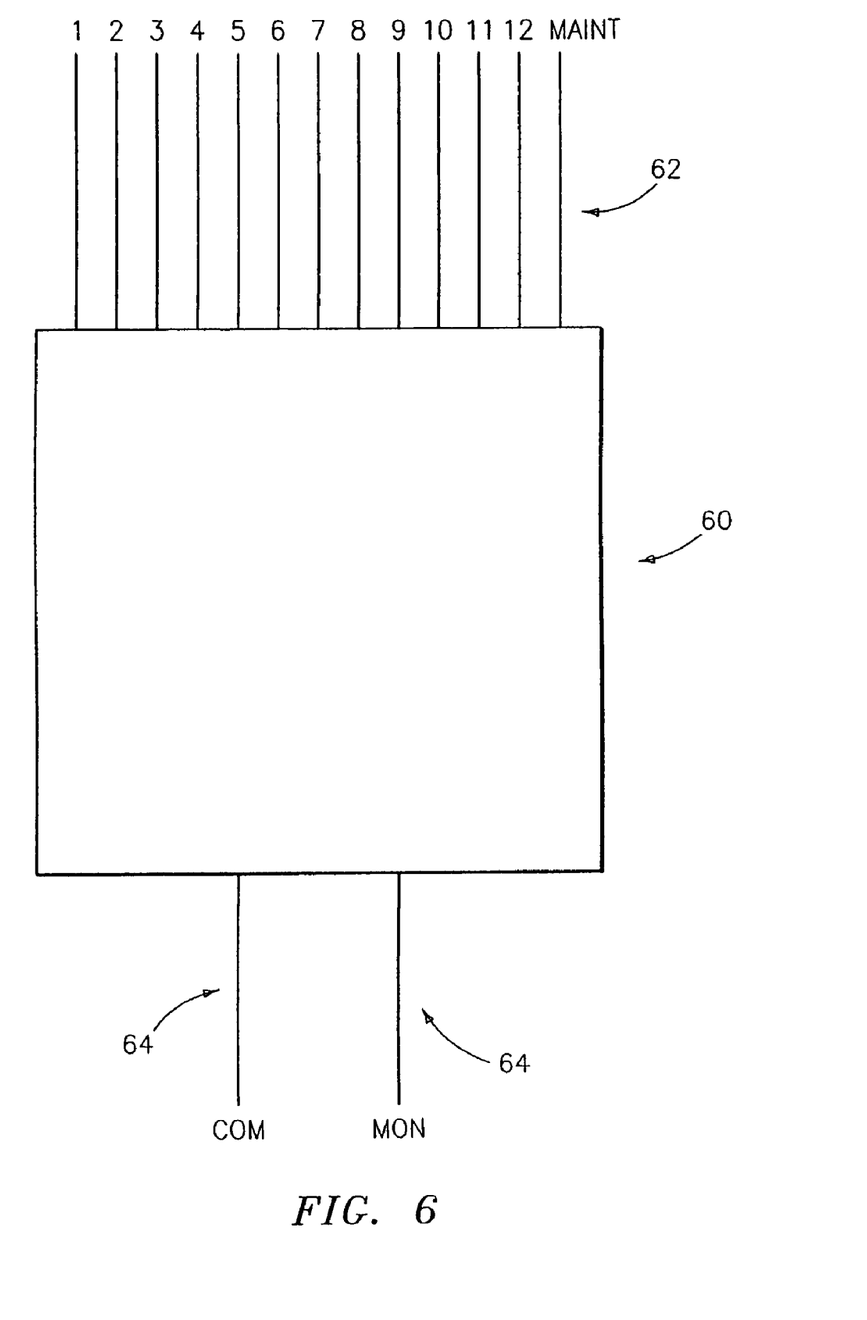
FIG. 6 is a diagram representation of a passive multiplexing circuit.

FIG. 6 illustrates a diagram for the passive multiplexing circuit 60. In a preferred embodiment, the circuit 60 has thirteen inputs 62, twelve of them numbered one to twelve and one labeled as MAINT. The circuit 60 has also two outputs 64 labeled as COM and MON. The circuit 60 performs a passive multiplexing and requires no external power. The circuit 60 takes thirteen optical signals of different frequencies and "merges" them into one common signal. The input signals, though merged into and carried through a common output optical cable, remains distinct and separated through a de-multiplexer.

Figure 7:
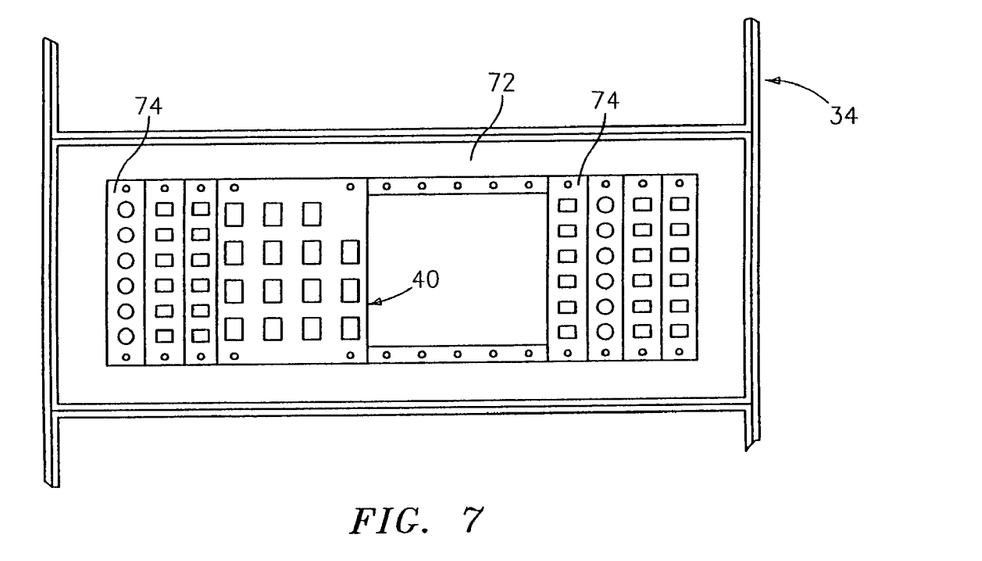
FIG. 7 is an illustration of a passive DWDM multiplexing module on a LGX patch panel.

FIG. 7 illustrates placement of a passive DWDM multiplexing module 40 on a patch panel 34. The module 40 has a suitable dimension that allows it to be placed in a standard shelf of a patch panel 34. In a preferred embodiment, the module 40 takes-up three slots in the standard shelf 72. Each slot generally receives a six-pack connector 74. Each six-pack connector 74 receives six incoming optical cables on its back panel and offers six connectors on its front panel. Generally, incoming optical cables are terminated on the back panel of a six-pack connector 74 and the outgoing connector optical cables are connected to the front panel of the six-pack connector 74. People skilled in the art will appreciate that the module 40 may have other physical dimensions and occupy a different number of slots in a patch panel 34.

When in use, the multi-channel passive DWDM multiplexing module 40 according to the present invention improves greatly the fiber optical cable routing in a central office. The multiplexing of incoming fiber cables carrying one single optical signal into an outgoing fiber cable carrying multiplexed optical signals needs no longer be accomplished by a multiplexer located remotely from where incoming and outgoing cables are terminated. The multiplexing may be performed in the same patch panel where all cables are terminated.

In an alternate embodiment, the module 40 with a new internal circuit can function as a passive multi-channel DWDM demultiplexing module. In this embodiment, a single incoming multiplexed optical signal can be filtered to produce a plurality of optical signals each with a defined frequency. The demultiplexing function performed by the alternate embodiment is optically opposite from the multiplexing function performed by the multi-channel DWDM multiplexing module 40.

Figure 8:
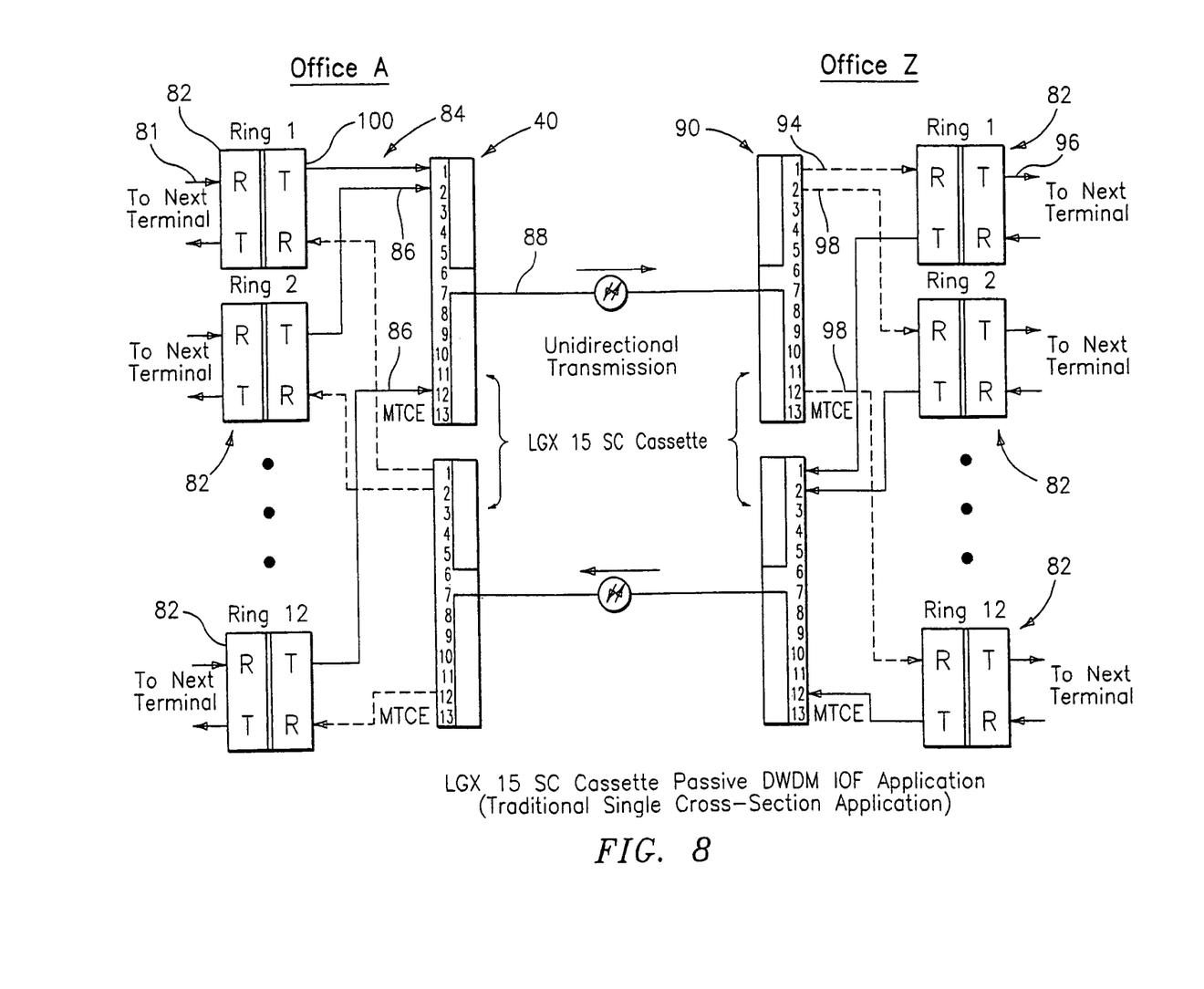

FIG. 8 illustrates the use of two embodiments of the present invention, one embodiment as a multiplexer and another embodiment as a de-multiplexer, in a transmission between two central offices, A and Z. Each office supports several fiber optical rings connecting to user terminals. An optical signal 81 is terminated at a receiver of a optical signal processor 82 in the Office A. The optical signal 81 is processed at the optical signal processor 82 and a new optical signal 84 is generated by a laser transmitter of the optical signal processor 82. The new optical signal 84 is routed to an input connector of a multi-channel passive DWDM module 40 according to the present invention, where the optical signal 84 is multiplexed with optical signals 86 from other fiber optical rings supported by the Office A.

The multiplexed output optical signal 88 is carried through a cable to Office Z, where the optical signal 88 is connected to a COM input of a demultiplexing module 90. The optical signal 88 is filtered by the demultiplexing module 90 to produce a plurality of single optical signals. Each filtered optical signal has the original characteristics, i.e., the output optical signal 94 would have the same optical frequency as the input optical signal 84. The optical signal 94 is fed to an optical receiver of an optical signal processor 82 in the Office Z. The optical signal 94 is processed by the optical signal processor 82 and a new optical signal 96 is generated by a laser transmitter of the signal processor 82. The optical signal 96 is then transmitted to a user destination. Different optical signals 98 filtered by the demultiplexing module 90 are fed into different optical receivers.

The laser transmitters are circuit boards that convert electrical signals into laser signals of specific frequency. Generally, each laser transmitter generates an optical laser of a specific wavelength, while optical receivers can handle laser optical signals of different wavelengths. For equipment that handles 16 different electrical signals, 16 laser transmitters are needed to generate 16 lasers of 16 different frequencies. These 16 lasers can then be "stacked," or multiplexed together and transported on a single fiber optical cable. Therefore, in each Central Office, the sparing strategy is to have one spare laser transmitter of each optical signal frequency. In an Office, for each optical signal processor that handles 12 different optical signals, there are at least twelve spare laser transmitters. Considering that each Office may have many optical signal processors, the cost of spare parts can be very expensive. The use of a multi-channel passive DWDM multiplexer module 40 according to the present invention reduces the cost of spare parts substantially.

Using FIG. 8 as an example, in an Office that employs multi-channel passive DWDM multiplexer modules 40 according to the present invention, the spare laser transmitter can be of one frequency. Namely, the frequency reserved for the maintenance port. If a laser transmitter 100 of Ring 1 that generates optical signal 84 fails, the maintenance technician removes the failing transmitter 100 and removes the optical connector cable between the failing transmitter 100 and the input connector 1 of the multi-channel passive DWDM multiplexer module 40. Then, the maintenance technician plugs a spare laser transmitter into the slot for the transmitter 100 and connects an output optical cable from this laser transmitter to the maintenance port 13 of the module 40. At the receiving office, another technician needs to unplug the optical connector cable 94 from the output connector 1 and plugs it into the maintenance connector 13. There is no need to change the other end of the optical connector cable 94 connected to a receiver, because the receiver generally handles lasers of different frequencies.

When the failing transmitter 100 is repaired or a replacement is received, then the maintenance technician can proceed to replace it and restore the connections to their original configuration.

The above-described procedure reduces the cost of spare parts significantly because each central office can spare only a few laser transmitters of the frequency assigned to the maintenance port of a multi-channel passive DWDM multiplexing module 40.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What is claimed is:

1. An apparatus for multiple-channel passive dense wavelength division multiplexing (DWDM), the apparatus comprising:
   a housing for mounting in a front panel of a distribution frame in a switching office;
   circuitry contained inside the housing, the circuitry performing multiple-channel passive DWDM by receiving a plurality of inputs and providing one output and providing a non-intrusive monitoring port;
   a faceplate attached to the housing, the faceplate having a plurality of openings; and
   a plurality of connectors, wherein each connector resides in one of the plurality of openings in the faceplate, each connector having two ends, one end being connected to an input of the circuitry and another end accepting an input cable,
   wherein each of the plurality of inputs accepts one optical signal of a defined wavelength, where one of the inputs is for maintenance purposes and is associated with a maintenance wavelength different than the defined wavelengths used in the event of a failure of one of the defined wavelengths.

2. The apparatus of claim 1 wherein the circuitry is capable of receiving 13 inputs.

3. The apparatus of claim 1, wherein the input cable is a fiber optic cable.

4. The apparatus of claim 3, wherein the input cable carries a signal of a defined standard wavelength.

5. The apparatus of claim 3, wherein the input cable being capable of carrying an optical signal of a defined wavelength selected from the group of 1530.33 nanometer, 1533.47 nanometer, 1535.04 nanometer, 1538.19 nanometer, 1539.77 nanometer, 1541.35 nanometer, 1547.72 nanometer, 1549.32 nanometer, 1550.92 nanometer, 1552.52 nanometer, 1555.75 nanometer, 1557.36 nanometer, end 1558.98 nanometer.

6. An apparatus for multiple-channel passive dense wavelength division de-multiplexing, the apparatus comprising:
   a housing for mounting in a front panel of a distribution frame in a switching office;
   circuitry contained inside the housing, the circuitry performing multiple-channel passive dense wavelength division de-multiplexing by receiving an input and providing a plurality of outputs and providing a non-intrusive monitoring port;
   a faceplate attached to the housing, the faceplate having a plurality of openings; and
   a plurality of connectors, wherein each connector resides in one of the plurality of openings in the faceplate, each connector having two ends, one end being connected to an output of the circuitry and other end accepting an output cable,
   wherein each of the plurality of outputs carries one optical signal of a defined wavelength, where one of the outputs is for maintenance purposes and is associated with a maintenance wavelength different than the defined wavelengths used in the event of a failure of one of the defined wavelengths.

7. The apparatus of claim 6 wherein the circuitry is capable of providing 13 outputs.

8. The apparatus of claim 6, wherein the output cable is a fiber optic cable.

9. The apparatus of claim 8, wherein the output cable carries a signal of a defined standard wavelength.

10. The apparatus of claim 8, wherein the output cable being capable of carrying an optical signal of a defined wavelength selected from the group of 1530.33 nanometer, 1533.47 nanometer, 1535.04 nanometer, 1538.19 nanometer, 1539.77 nanometer, 1541.35 nanometer, 1547.72 nanometer, 1549.32 nanometer, 1550.92 nanometer, 1552.52 nanometer, 1555.75 nanometer, 1557.36 nanometer, and 1558.98 nanometer.

* * * * *